(12) United States Patent
Meyers et al.

(10) Patent No.: US 7,945,168 B2
(45) Date of Patent: May 17, 2011

(54) FREE-SPACE QUANTUM COMMUNICATIONS SYSTEM AND PROCESS OPERATIVE ABSENT LINE-OF-SIGHT

(75) Inventors: Ronald Everett Meyers, Columbia, MD (US); Keith Scott Deacon, Coumbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 12/859,834

(22) Filed: Aug. 20, 2010

(65) Prior Publication Data

US 2010/0310259 A1    Dec. 9, 2010

Related U.S. Application Data

(62) Division of application No. 11/387,085, filed on Mar. 20, 2006, now Pat. No. 7,805,079.

(60) Provisional application No. 60/663,143, filed on Mar. 18, 2005.

(51) Int. Cl.
*H04B 10/00* (2006.01)

(52) U.S. Cl. ............ 398/118; 398/39; 398/40; 398/130; 398/140; 398/152; 398/153; 398/154; 398/183; 380/44; 380/255; 380/277

(58) Field of Classification Search .................... 398/39, 398/40, 118, 130, 140, 152–154, 183; 380/44, 380/255–277; 250/221, 225
See application file for complete search history.

(56) References Cited

U.S. PATENT DOCUMENTS

| | | |
|---|---|---|
| 4,493,114 A | 1/1985 | Geller et al. |
| 5,062,154 A | 10/1991 | Geller et al. |
| 5,113,524 A | 5/1992 | Hirota et al. |
| 5,301,051 A * | 4/1994 | Geller .......................... 398/118 |
| 5,307,194 A | 4/1994 | Hatton et al. |
| 5,339,182 A | 8/1994 | Kimble et al. |
| 5,515,438 A | 5/1996 | Bennett et al. |
| 5,966,224 A | 10/1999 | Hughes et al. |
| 6,289,104 B1 | 9/2001 | Patterson et al. |
| 6,748,083 B2 | 6/2004 | Hughes et al. |
| 6,778,779 B1 | 8/2004 | Shay et al. |

(Continued)

OTHER PUBLICATIONS

R. Meyers, et al. "Entangled Quantum Communications and Quantum Imaging," SPIE Proceedings vol. 5161, pp. 280-286 (2003).

(Continued)

*Primary Examiner* — Li Liu
(74) *Attorney, Agent, or Firm* — Lawrence E. Anderson

(57) ABSTRACT

Photonic signals are tagged with a pre-selected modification, such as a polarization signature to carry data across an obstructed path between sender and receiver. Communication authentication through polarization variation allows for Yuen-Kumar or entangled photon quantum communication protocols to propagate through environmental scattering media such as air, smoke, fog, rain, and water. While ultraviolet light photons are well suited as a carrier for quantum communication signals scattered in air, it is appreciated that visible wavelengths have longer propagation paths in water to convey non-line-of-sight data. A secure signal is scattered by the media and simultaneously communicated to a single recipient or multiple recipients exposed to scattered signal portions. A process of solving the scattering processes through a random scattering media is provided to reconstruct a quantum keyed message at a receiver. The scattering of the signal is utilized herein to provide non-line-of-sight and intentional short-range communication.

19 Claims, 3 Drawing Sheets

U.S. PATENT DOCUMENTS

| | | | |
|---|---|---|---|
| 6,897,434 B1 * | 5/2005 | Kumar et al. | ............ 250/227.18 |
| 7,660,533 B1 | 2/2010 | Meyers et al. | |
| 2002/0048059 A1 | 4/2002 | Azuma | |
| 2002/0048370 A1 | 4/2002 | Hirota et al. | |

OTHER PUBLICATIONS

Kahnert, "Numerical methods in electromagnetic scattering theory," J. of Quantitative Spectroscopy & Radiative Transfer 79-80, 775-824 (2003).

Yuen, "Quantum versus classical noise cryptography", Quantum Communications and Measurements II, ed. P. Kumar et al., Plenum Press, 2000.

Yuen, "Anonymous key quantum cryptography and Unconditionally Secure Quantum Bit Committment," Quantum Communications, Computations, and Measurements III, ed. P. Tomesi, et al., Plenum Press, 2001.

Xu et al., "Stochastic view of photon migration in turbid media," cond-mat/0401409, http://arxiv.org.

Ingensand et al. "High accuracy Alignment System Based on the Dispersion Effect" Proc. IWAA97, 5th Workshop on Accelerator Alignment, ANL/FNL, 10/13-17/97 Argonne, IL http://www.aps.anl.gov/conferences/iwaa97/finpap.html.

Pinnick et al., "Aerosol-induced laser breakdown thresholds: wavelength dependence," Appl. Opt. 27, 987-996 (1988).

Brusselbach et al., "Real-time atmospheric compensation by stimulated Brillouin-scattering phase conjugation," J. Opt. Soc. Am. B 12, 1434-1447 (1995).

Elterman, "Rayleigh and extinction coefficients to 50 km for the region 0.27 µ to 0.55 µ," Appl. Opt. 3, 1139-1147 (1964).

Trakhovskky et al., "Contribution of oxygen to attenuation in the solar blind UV spectral region," Appl. Opt. 28, 1588-1592 (1989).

Miles et al., "Laser Rayleigh scattering," Meas. Sci. Technol., 12, R33-R52 (2001).

Born et al., Principles of Optics: Electromagnetic Theory of Propagation; interference and diffraction of light, "Diffraction by a conducting Sphere". 7th ed. (Cambridge Univ. Press, Cambridge, UK 1999) pp. 633-644.

Rossum et al., "Multiple scattering of classical waves: miroscopy, mesoscopy, and diffusion," Rev. Mod. Phys 17, N1 pp. 1-88 (1999).

Ishamaru, "Wave Propagation and Scattering in Random Media," Chapter 16 "Scattering of Waves From Randuom Contnuum and Turbulent Media," pp. 321-340 (Academic Press, New York, 1978).

Sienfeld, Air Pollution and Chemical Fundamentals, pp. 1-15 (McGraw-Hill, New York, 1975).

Van De Hulst, Light Scattering by Small Particles, "Basic Scattering Theory," pp. 3-10, 28-39, "Applications to Meteorology," 414-434 (Dover, New York, 1981).

Masonis et al., "2003: A study of the extinction-to-backscatter ratio of marine aerosol during the shore-line environment . . . ," J. Atmos. Ocean. Tech. 20, 1388-1402 (2003).

Hua et al., "Ultraviolet high-spectral-resolution Rayleigh-Mie lidar with a dual-pass Fabry-Perot etalon for measuring atmospheric . . . ," OpLett. 29, 1063-1065 (2004).

Thompson et al., "Rayleigh Laser Guide Star Systems: Application to UnISIS," astroph/0207074, http://arxiv.org.

Sharma et al., "Stand-off Raman spectroscopic detection of minerals on planetary surfaces," Spect. Acta Part A 59, 2391-2407 (2003).

Khan et al., "Laser-triggered lightning discharge," New J. Phys. 4, 61.1-61.20 (2002).

Chen et al., "High-sensitivity direct detection optical communication system that operates in sunlight," Proceedings of SPIE, 2123, pp. 448-454 (1994).

O. Hirota, "Quantum stream cipher based on optical communications", Proceedings SPIE, 5551 (2004).

"Principles of Optics" by Born & Wolf, 7th Edition, Chapter XI, "Rigorous Diffraction Theory,"pp. 633-644, Cambridge 1999.

C. Barbosa, et al. "Quantum Crytography in Free Space with coherent-state light," Proceedings SPIE Col. 4821, 2002.

Yen, et al. "Intentionally short-range Communications (ISRC) 1993 Report," Tech. Rep. 1649SPA WAR, U.S. Navy, Feb. 1994.

Lodahl, et al. "Transport of Quantum Noise Through Random Media," Phys. Rev. Lett. 94, 153905 (2005) [4 pages] quant-ph/0410113.

Lodahl, et al. "Spatial Quantum Correlations in Mutiliple Scattered Light," Physical Review Letters, 95 (17). p. 173901. ISSN 0031-9007 quant-ph/0502033,http://arxiv.org.

* cited by examiner

FREE-SPACE QUANTUM COMMUNICATIONS SYSTEM AND PROCESS OPERATIVE ABSENT LINE-OF-SIGHT

RELATED APPLICATION

This application is a divisional application of and claims priority of U.S. Nonprovisional patent application Ser. No. 11/387,085 entitled "Free-space Quantum Communications Process Operative Abesent Line-of-sight" filed Mar. 20, 2006, and also claims priority of U.S. Provisional Patent Application Ser. No. 60/663,143 filed Mar. 18, 2005, both of which are incorporated herein by reference.

GOVERNMENT INTEREST

The invention described herein may be manufactured, used, and licensed by or for the United States Government.

FIELD OF THE INVENTION

This invention relates in general to methods and apparatus for non-line-of-sight quantum communication and in particular to a short-range, secure optical communication scheme using the properties of solar blind photon propagation in the scattering media.

BACKGROUND OF THE INVENTION

Currently, short-range communication of up to one kilometer is largely dependent on infrastructure-intensive cellular networks, direct radio frequency or optical signaling. However, in regions lacking such infrastructure and points of communication are separated by obstructions, these traditional methods of communication are inadequate. Additionally, traditional optical and radio frequency communication are prone to interference associated with conditions such as environmental scatter and other signals. In situations where confidential information is to be communicated, existing methods of information transmission rely on data encryption since the transmitted signals are subject to eavesdropping. These problems have previously been so intractable in the area of secure communication that business, governmental, and military units often resort to couriers for the short-range transport of such messages. The use of a courier is an incomplete solution that is cumbersome and slow, especially when a geographic or manmade obstacle is involved.

In an effort to address these limitations, others have looked to optical communication. There have been reports of U.S. Navy research on intentionally short-range optical communications [5]. Many solar-blind UV systems were reported on, including an ultraviolet (UV) laser system that showed 500 m non-line-of-sight (NLOS) digital data transmission in field tests. Unfortunately, the reported transmissions were not of a secure nature.

Thus, there exists a need for a short range, secure communication that is not dependent on line-of-sight. An additional need exists for a communication system that is tolerant of environmental scattering as the signal propagates there through.

SUMMARY OF THE INVENTION

Photonic signals are tagged with a pre-selected modification, such as a polarization signature to carry data across an obstructed path between sender and receiver. Communication authentication through polarization variation allows for Yuen-Kumar or entangled photon quantum communication protocols to propagate through environmental scattering media such as air, smoke, fog, rain, and water. While ultraviolet light photons are well suited as a carrier for quantum communication signals scattered in air, it is appreciated that visible wavelengths have longer propagation paths in water to convey non-line-of-sight data. A secure signal is scattered by the media and simultaneously communicated to a single recipient or multiple recipients exposed to scattered signal portions. A process of solving the scattering processes through a random scattering media is provided to reconstruct a quantum encoded message at a receiver. The scattering of the signal is utilized herein to provide non-line-of-sight and intentional short-range communication.

DESCRIPTION OF THE PREFERRED EMBODIMENTS

Figure 1:
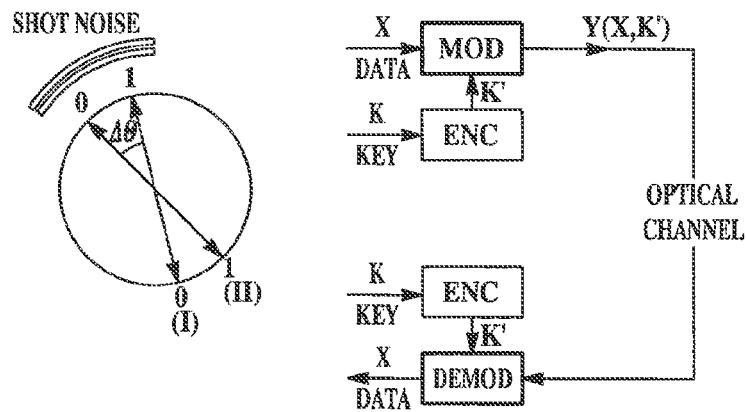
FIG. 1 is a prior art scheme depicting a key encryption technique based on coherent state qumodes.

The present invention has utility as a secure short range quantum communication scheme that is operative independent of a direct line of sight between a sender and receiver. The scatter caused by the environment to a light beam is the basis of non-line-of-sight communication. The manipulation of photons as a carrier for quantum communication data is provided by a polarization signature as the basis for the inventive non-line of sight secure, short range communication. The present invention has applications for communication within mobile small networks that optionally have a need for simultaneous multicasting to multiple recipients.

As used herein "short-range" communication is defined as the ability to send a signal between a sender and receiver separated by up to several kilometers, within an outside range of ten kilometers.

It is appreciated that ultraviolet (UV) radiation is well suited for non-line-of-sight quantum communication in air; specific wavelengths will have different scattering characteristics under a given set of environmental conditions illustratively including humidity, particulate and turbulence. In a preferred embodiment, a UV light source, such as UV laser is provided with multiple laser lines is used with the ability to change carrier wave wavelength to achieve a desired range of signal propagation through the scattering medium. The present invention is also operative with water as the scattering media with the recognition that longer wavelengths of visible blue-green light have greater propagation distances in water relative to ultraviolet wavelengths. As such, a water based intentionally short-range non-line-of-sight quantum communication system uses a blue-green carrier wavelength of between 440 and 560 nanometers for maximal range. It is appreciated that the present invention is also operative in transmission through solid substance such as ice, soil, and rock with resort to a propagation wavelength that is scattered by the solid media, yet transmissive through the volume of solid to be traverse by the message. Communication through a solid typically involves infrared and longer wavelengths of more than 800 nanometers.

UV radiation is subject to absorption and scattering in media. The media is characterized by absorption and scattering parameters. When considering in the abstract, a light ray scattering can be characterized by Mueller matrices which also handle partial absorption. On the other hand, scattering of discrete photons results in absorption or a form of scattering depending on the state of the photon and atoms. When light is scattered by a scattering media, each photon takes a different path as a result of scattering off the separate atoms or aggregate groups of atoms such as aerosols. The result of the scattered collection of photons is a beam that spreads due to scattering in turbid media, analogous to a diffusion or Markov process. The dispersion in the atmosphere depends on the wavelength.

To understand light propagation through a random medium, resort is made to Maxwell's equation. Environmental media such as air, water, smoke and fog are well approximated as random media. Maxwell's equations can be put in the following form typically suitable for scattering considerations [1].

$$\nabla \cdot D(r, t) = -4\pi\rho(r, t)$$

$$\nabla \times E(r, t) = -\frac{1}{c_0}\frac{\partial B(r, t)}{\partial t}$$

$$\nabla \cdot B(r, t) = 0$$

$$\nabla \times H(r, t) = \frac{4\pi j(r, t)}{c_0} + \frac{1}{c_0}\frac{\partial D(r, t)}{\partial t}$$

For scattering purposes the version of the equations that are uses assume no sources and currents. The material properties are provided by the relations $$D(r,t) = \epsilon(r)E(r,t)$$

$$B(r,t) = \mu(r)H(r,t)$$

where $\epsilon(r)$ and $\mu(r)$ are in the form of scalars for isotropic media and otherwise are in the form of tensors. Substituting the isotopic media scalar forms of these equations into Maxwell's Equations yields $$\nabla \cdot D(r, t) = 0$$

$$\nabla \times E(r, t) = -\frac{\mu(r)}{c_0}\frac{\partial H(r, t)}{\partial t}$$

$$\nabla \cdot H(r, t) = 0$$

$$\nabla \times H(r, t) = \frac{\epsilon(r)}{c_0}\frac{\partial E(r, t)}{\partial t}$$

These equations can be combined to obtain $$\nabla \times \nabla \times E(r, t) = -\frac{\epsilon(r)\mu(r)}{c_0^2}\frac{\partial^2 E(r, t)}{\partial t^2}$$

If time harmonic solutions are assumed as $$E(r,t) = \exp(-iwt)E(r,t)$$

then the vector Helmholtz equation is obtained $$\nabla \times \nabla \times E(r, t) = -\frac{\omega^2}{c_0^2}\epsilon(r)\mu(r)E(r, t)$$

Using a vector identity produces a simpler Helmholtz equation, $$[\nabla^2 + k^2(r)]E(r) = 0$$

and $$[\nabla^2 + k^2(r)]H(r) = 0$$

where $$k^2(r) = \frac{\omega^2}{c_0^2}\epsilon(r)\mu(r)$$

The equation needs to be solved subject to boundary conditions and a radiation condition [1]. Usually these equations apply scattering to single particles. However a T Matrix method can be used to average over the orientations of ensembles of particles [1]. However, other solutions are possible. The equation subject to random parameters is subjected to the Decomposition Method to model the information reconstruction as a receiver subsequent to scatter.

The Decomposition Method is applied to the random Helmholtz equation $$[\nabla^2 + k^2(r)]E(r) = g(r)$$

in Cartesian coordinates. Here $k^2(r)$ is considered to be a random variable with outcomes prescribed by a probability density function. The equation is solved as $$L_x E + L_y E + L_z E + k^2(x,y,z)E = g(x,y,z)$$

where $$\nabla^2 = L_x + L_y + L_z$$

and $$L_x(\cdot) = \frac{\partial^2}{\partial x^2}(\cdot)$$

$$L_y(\cdot) = \frac{\partial^2}{\partial y^2}(\cdot)$$

$$L_z(\cdot) = \frac{\partial^2}{\partial z^2}(\cdot)$$

The inverse operators are defined as $$L_x^{-1}(\cdot) = \int_0^x \int_0^x (\cdot) dx\, dx$$

$$L_y^{-1}(\cdot) = \int_0^x \int_0^x (\cdot) dx\, dx$$

$$L_z^{-1}(\cdot) = \int_0^x \int_0^x (\cdot) dx\, dx.$$

Now the system of equations is put into the triplicate form by shifting the operators $$L_x E = -L_y E - L_z E - k^2(x,y,z)E + g(x,y,z)$$

$$L_y E = -L_x E - L_z E - k^2(x,y,z)E + g(x,y,z)$$

$$L_z E = -L_x E - L_y E - k^2(x,y,z)E + g(x,y,z).$$

Each equation is capable of a separate solution given suitable boundary conditions. However in this form it is possible to average the solutions at each step and obtain a different approximation or convergence rate.

Operating on the first equation yields $$L_x^{-1}L_xE = -L_x^{-1}L_yE - L_x^{-1}L_zE - L_x^{-1}k^2(x,y,z)E + L_x^{-1}g(x,y,z)$$

The result is $$E(x,y,z) = E(0,y,z) + xE_x(0,y,z) - L_x^{-1}L_yE - L_x^{-1}L_zE - L_x^{-1}k^2(x,y,z)E + L_x^{-1}g(x,y,z)$$

$$E(x,y,z) = E(x,0,z) + yE_y(x,0,z) - L_y^{-1}L_xE - L_y^{-1}L_zE - L_y^{-1}k^2(x,y,z)E + L_y^{-1}g(x,y,z)$$

$$E(x,y,z) = E(x,y,0) + zE_z(x,y,0) - L_z^{-1}L_yE - L_z^{-1}L_xE - L_z^{-1}k^2(x,y,z)E + L_z^{-1}g(x,y,z)$$

The terms E are expanded in a series $$E = \sum_{n=0}^{\infty} E_n$$

The zeroth terms are $$E_0(x,y,z) = E(0,y,z) + xE_x(0,y,z) + L_x^{-1}g(x,y,z)$$

$$E_0(x,y,z) = E(x,0,z) + yE_y(x,0,z) + L_y^{-1}g(x,y,z)$$

$$E_0(x,y,z) = E(x,y,0) + zE_z(x,y,0) + L_z^{-1}g(x,y,z)$$

At the next step the partial solutions are averaged or integrated separately to find $E_1(x,y,z)$.

A recursion yields $$E(x,y,z) = E_0 + \sum_{n=1}^{\infty}\begin{bmatrix} -L_x^{-1}L_yE_{n-1} - L_x^{-1}L_zE_{n-1} - \\ L_x^{-1}k^2(x,y,z)E_{n-1} \end{bmatrix}$$

$$E(x,y,z) = E_0 + \sum_{n=1}^{\infty}\begin{bmatrix} -L_y^{-1}L_xE_{n-1} - L_y^{-1}L_zE_{n-1} - \\ L_y^{-1}k^2(x,y,z)E_{n-1} \end{bmatrix}$$

$$E(x,y,z) = E_0 + \sum_{n=1}^{\infty}\begin{bmatrix} -L_z^{-1}L_xE_{n-1} - L_z^{-1}L_yE_{n-1} - \\ L_z^{-1}k^2(x,y,z)E_{n-1} \end{bmatrix}$$

Resulting from the scattered collection of photons is a beam that spreads because of scattering in turbid media, which is analogous to a diffusion or Markov process [6]. The dispersion in the atmosphere depends on the wavelength [7]. While many of the photons of the beam change polarization, some of the photons do not have polarization changes, and some have only small polarization changes. Over small distances the polarization of most photons does not change very much, although some photons will have significant changes in polarization. Experimental results on beam breakdown caused by aerosols at 266 nm have also been presented [8]. These types of data can be compared against longer wavelength energy loss. Atmospheric propagation losses at the longer wavelength of 523 nm are known [9].

In the atmosphere, ozone and oxygen are the major absorbers [10, 11]. Radiation is scattered by molecules, according to the Rayleigh scattering process [12], and by aerosols, according to general Mie scattering principles [13]. In the case of the atmosphere or any fluid, the density and corresponding index of refraction time-space variability create beam spreading called optical turbulence [14, 15]. In the atmosphere there is far more scattering for UV than for visible light.

Because atmospheric density decreases quickly with height, in the ideal atmosphere there is less turbulence-induced scattering for UV vertical beams than for horizontal beams. In non-storm conditions the turbulence near the ground tends to have more thermal, moisture, and terrain forcing. The atmosphere has temperature and density inversions as a function of height. These inversions create channeling, ducting, and reflecting of signals due to density patterns. The inversions often signal pollution layers. These concentrations have their own scattering and absorption properties [16-18]. In addition meteorological clouds may be present. These clouds provide extra scattering properties. The density of the atmosphere decreases rapidly with height, and under ideal conditions UV for light detection and ranging (lidar) can propagate many kilometers in the vertical [19]. Results of a UV 351 nm guidestar system working out to 20 km from the ground have been documented [20]. Stand-off remote Raman lidar using 266 nm light for ranges up to 60 m [21] have been documented. A study predicts the character of 200 m pulse propagation for 220-440 nm laser pulses [22].

Non-Poisson quantum fluctuations in an invariance regime can propagate farther than coherent laser speckle. In such situations the non-Poissonian statistics survive over long distances [23]. Lodhal shows that the spatial correlations of quantum light have "infinite" range and remain intact after moving through random media. The non-Poisson aspects of a quantum system in having a long linear extent relative to classical beam coherence is invoked in the present invention to for authentication and increased transmission range beyond the extent of laser speckle or other coherence associated with the light source.

A variation of the polarization amplitude or timing allows Yuen-Kumar [3] quantum communication (QC) as an authentication of the signal. QC in the presence of scattering has implications in quantum microdevices, such as quantum dots used for quantum computing and QC as well as in the macro environment.

Free-space UV QC is more stealthy than many other forms of visible light optical communication. If the UV is in the solar blind region then there are far fewer competing external noise photons from the sun. The source beam is absorbed by the atmosphere after a propagation distance of a kilometer or so and will thus be shielded by the atmosphere from long-distance surveillance. Also, because of the small natural background of UV solar blind noise photons, a smaller source strength can be used and hence lower power. The quantum encoding presents secure encryption capability.

Tagging a photon modeled by scatter from a random media with a polarization or an entanglement with another photon signature provides a method of communicating information by way of a scattered photon.

A quantum key encryption technique according to the present invention preferably invokes Yuen-Kumar coherent states of different amplitudes that are linearly independent and span infinite dimensional space denoted as qumodes. In a single-mode realization, M possible coherent states $|\alpha_l\rangle$ are represented by $$\alpha_l = \alpha_o(\cos\theta_l + i\sin\theta_l)_2, \quad \theta_l = \frac{2\pi l}{M}, \quad l = 1, \ldots M$$

where $\alpha_0^2$ is the observable probability as to the occurrence of the state and the angle between two neighboring states is $2\pi/M$ [2]. In a two-mode realization, for example, the prior art Yuen-Kumar free-space scheme is presented in FIG. 1, where the states are a product of two different coherent states as defined by $$|\alpha_o\cos\theta_l\rangle_1|\alpha_o\sin\theta_l\rangle_2, \theta_l = \frac{2\pi l}{M}, l = 1, \ldots M$$

The qumodes are optionally associated with polarization, time, or frequency. As depicted in prior art FIG. 1 (Left), M points uniformly distributed on a fixed great circle on the Poincaré sphere are used for M/2 possible bases. The opposite points on a diameter correspond to two orthogonal states of a basis, representing the 0 and 1 bit value for that basis. The two neighbors of each point on the circle are taken to represent a different bit value. A secret key is used to select a specific basis for each qumode between users A and B, as well as a polarity bit that is added to the data bit for randomizing the polarity of the basis. A long running key K' for such selection is obtained as the output from a standard encryption mechanism operating on a basic shorter key K, as depicted in FIG. 1 (Right). For each data bit, a total of $1+\log_2(M/2)$ bits from K' is used to determine the polarity bit and the selection of M/2 possible bases. Yuen [3, 4] has shown that, granting an eavesdropper E a perfect copy of the ciphered bit but without knowing the secret key, the probability of error is $P_e \sim \frac{1}{2}$, when $M \gg \alpha_0$, while $P_e \sim e^{-\alpha^2 P}$ for B, since the secret key is known to B. Thus even with perfect eavesdropping, that is, getting a perfect copy of the ciphered bit, E's probability of making correct decisions is the same as pure guessing.

In application a secret key is used to synchronize the qumode variable. Preferably, the qumode variable is polarization of a light source even though, through the use of a frequency modulating crystal or a chopper, frequency or pulse time qumode variables, respective are used. It is appreciated in the case of polarization that a large number of polarization keys are available as defined by the Poincaré sphere. A light source as used herein is appreciated to include both coherent sources and non-Poisson statistical sources. A light source is considered a coherent (or Poisson) light source when it satisfies at least criterion of: constant intensity, intensity fluctuation but only a small fraction of the output is used to transmit data, intensity fluctuations are rapid (temporal incoherence), perfect monochromaticity (spatially and temporally coherent), and quantum mechanically coherent state. A light source is considered an incoherent (or non-Poisson) light source when it satisfies at least criterion of: slow intensity fluctuations, is quasi-thermal, or the light produced is from an ensemble of light source elements.

A properly functioning laser operating as a Poissonian light source is appreciated to be a convenient, high flux source of photons is preferred for the practice of the present invention. However, as detailed above, non-Poissonian sources do afford advantages over Poissonian sources in terms of longer transmission distances and signal authentication.

Figure 2:
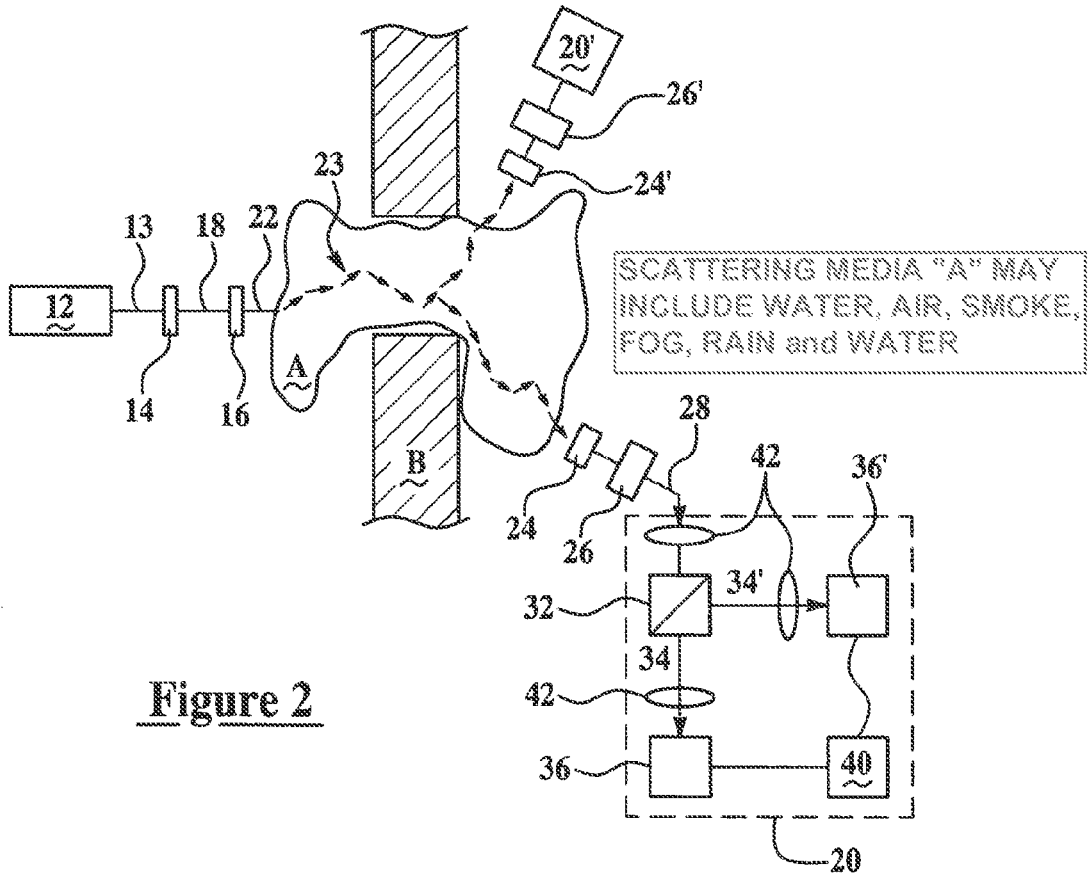
FIG. 2 is a schematic of an inventive non-line-of-sight quantum communication scheme operating with a Yuen-Kumar protocol, multiple receivers are depicted to illustrate the multi-cast aspect of the present invention.

A communication system according to the present invention is shown in FIG. 2 and uses an ultraviolet laser as a light source 12 in an air medium as a photonic source. A polarizer 14 receives a light source output 13 and is set to a preselected modification key value relative to a receiver shown generally at 20. It is appreciated that the effective communication range is decreased by insertion of a filter into the optical intermediate between the light source 12 and a receiver 20. An optical amplitude or phase modulator 16 receives the polarized quantum communication photonic signal 18 and creates an arbitrarily modulated quantum communication photonic signal 22 that proceeds to scatter through a light scattering medium denoted A. Exemplary polarization phase modulators illustratively include liquid crystals, Kerr cells, and Pockel cells. Preferably, a series of two liquid crystal devices and a quarter wave plate are used to achieve arbitrary polarization. A scattered portion 23 of the arbitrarily modulated quantum communication photonic signal 22 has scattered around an obstacle denoted at B. It is appreciated that the scatter that affords the non-line-of-sight capability of the present invention also limits the distance at which the arbitrarily modulated quantum communication photonic signal 22 is detectable.

A receiver 20 includes an optical phase or amplitude modulator 24 of the same type as that in place in the transmitter modulator 14, with the modulator 24 configured as a demodulator. A polarizer 26 is set to the same Poincaré sphere setting as polarizer 16 and represents the shared key. The resulting signal 28 then contacts a polarization beam splitter 32. Preferably beam splitter 32 is a 50/50 splitter. The orthogonal signals 34 and 34' are incident on photon detectors 36 and 36' that count incident photon receipt and report a counting event to temporal coincidence electronics 40 as a series of zeroes and ones. Photon detectors operative herein illustratively include single photon counting modules and conventional photon-intensity detectors such as charge coupled devices and gated photon counters. Optionally, lenses 42 are interposed within the receiver 20 to collimate optical signals to subsequent components. It is appreciated that beam on additional splitters or filters along an optical path further facilitates signal attenuation in the event of a signal of excessive intensity. A second receiver 20' is also depicted in FIG. 2 with like components relative to receiver 20 and modulator 24' and polarizer 26' to illustrate the multi-cast nature of the present invention.

Figure 3:
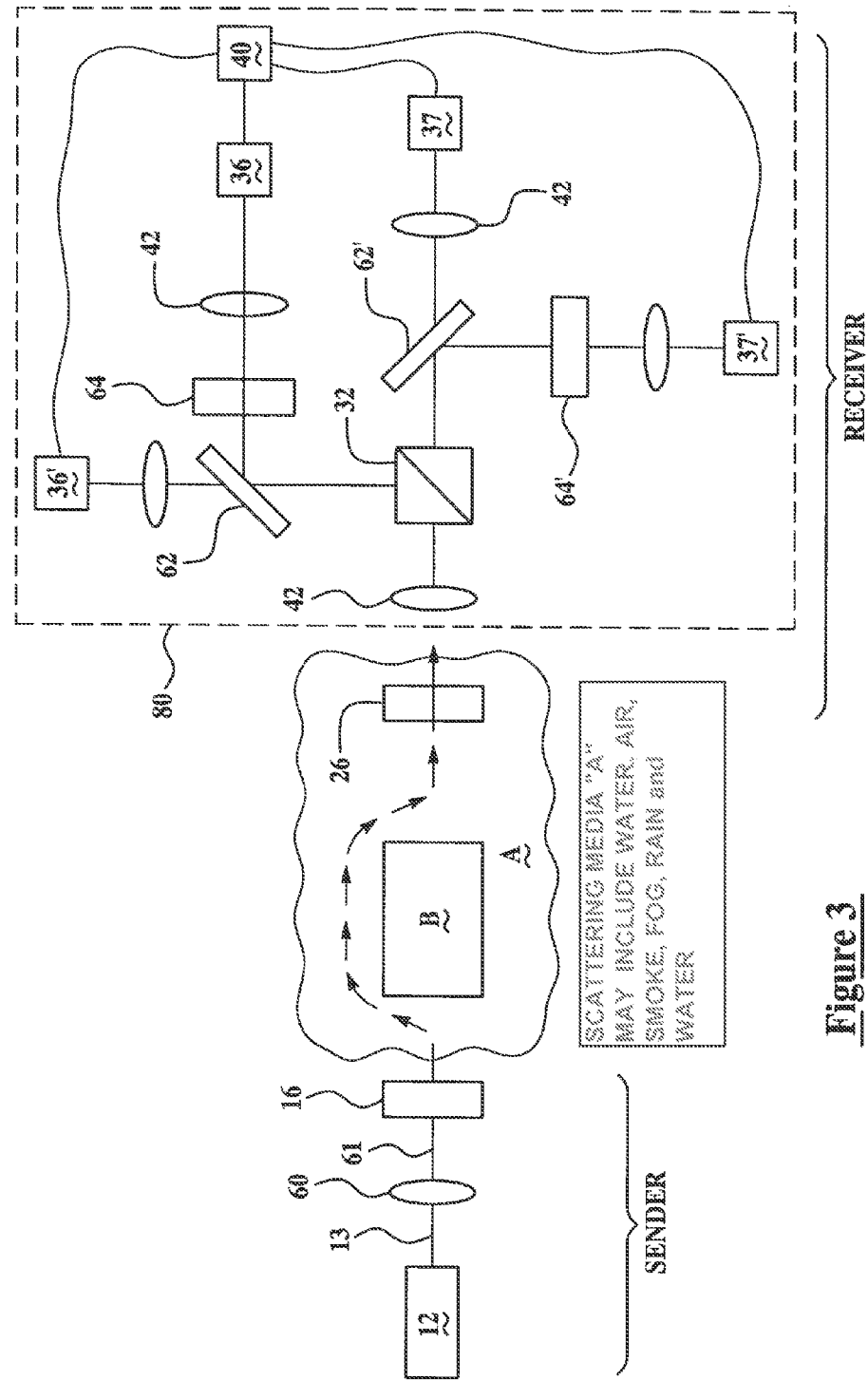
FIG. 3 is a schematic of an inventive non-line-of-sight quantum communication scheme operating with an entangled photon protocol.

It is appreciated that short range, non-line-of-sight quantum communication is also performed with a dual photon entangled pair carrier. As shown in FIG. 3, where like numerals correspond to those detailed with respect to FIG. 2, a Type-I nonlinear crystal 60 receives an optical output 13 from light source 12. The crystal 60 generates entangled photon pairs with near collinearity 61. The entangled photon pairs with near collinearity 61 is scattered by medium A to generate a scattered signal 63 that scatters around an obstacle B and to a receiver, shown collectively at 80. Preferably, the crystal 60 is tuned for non-degenerative down conversion with regard to dichroic mirrors 62 and 62'. Narrow band filters 64 and 64' are used to provide shared quantum keys after optical signals are transmitted through optional lenses 42 to photon detectors 36, 36', 37 and 37' before a signal is fed to electronics 40. Although the stochastic-energy-based entanglement technique is not theoretically resistant to eavesdropping on shared quantum keys, because of the possibility of cloning, in practice it is difficult to eavesdrop on because of timing constraints. This method can be used as a research model system and can be used to generate shared random keys in an environment where eavesdropping is not a threat. Optionally, the insertion of Poincaré sphere aligned polarizers 16 and 26 afford a secure communication system.

Presented herein are new quantum communication schemes suitable for free space (wireless) quantum communication implementation. In particular, presented are entangled quantum communication schemes and Non-line-of-Sight-Free-Space Photon Quantum Communications. The presence of atmospheric scattering media UV photons can be used for non-line of sight quantum communications. Non-Poisson quantum fluctuations in an invariance regime can propagate further than coherent laser speckle. In such situations the non-Poissonian statistics survive over long distances and should be taggable with a polarization signature. Quantum noise observables scale markedly differently with scattering parameters compared to classical noise observables. Variation of the polarization should allow Yuen-Kumar quantum communications using non-Poissonian statistics of the beam as an authentication of the signal.

The non-line of sight communication in the UV would be expected to be possible to at least a range of 1 km, and falls under the category of deliberately short range quantum communication. Such applications of importance for this method include military stealth and optical communications in the presence of obstacles such as a forest or urban environment.

Quantum wireless optical communications is a new field of communications. It is becoming important because it offers schemes of communications with unprecedented encryption security and because of its potential for information compression. Presented herein are new quantum communication schemes suitable for free-space quantum wireless (free-space) optical communication implementation. In particular, presented herein are several entangled quantum communication schemes originally configured for Line-of-Sight communications set forth for Non-Line-of-Sight (NLOS) Free-Space Photon Quantum Communications. In the presence of atmospheric scattering media, UV photons can be used for UV NLOS quantum communications.

Various designs of stochastic quantum communication systems do not have a modulator but depend on time information to unscramble information sent. An initial design and experimental look into stochastic quantum communications systems has been developed. An advantage of this approach is a savings in control electro-optics and possibly as an alternate way to encrypt. Cost reduction advantages are also likely to be realized in the future as advances in materials, design, and manufacturing are made.

Entanglement communication has been developed and analyzed by several laboratory systems where no modulation was used on the laser source; demonstrating the feasibility of using entangled stochastic quantum key distribution and entangled quantum imaging concepts. Lasers emit photons stochastically in time. At least one system developed by the inventors used the stochasticity of the photon source without any prescribed modulation of the laser source. Several stochastic quantum systems are discussed in the following where entanglement was used to advantage. Entanglement is an important property of quantum communications and was first described by Einstein as a spooky action at a distance. Key quantum entanglement properties were uncovered theoretically and experimentally. Entanglement can be used for several purposes including Quantum Key Distribution (QKD), 2n dense coding, image transfer, and heralding for signal collection. Novel QKD systems include Heralded Stochastic Quantum Key Distribution (HSQKD), Entanglement Enhanced Quantum Key Distribution (EEQKD), and Entangled Energy Quantum Key Distribution (EEnQKD). In addition, a novel Quantum imaging system has been analyzed and implemented. Also described is the embedding of a shared quantum key into a quantum imaging system. A quantum imaging system has been described which uses only one quantum channel to transmit the image information. The single channel imaging system is called Entanglement Imaging QKD Coincidence Detection.

The challenge of Quantum key distribution (QKD) is to use the understanding of quantum physics to generate and distribute cryptographic keys with to provide a higher level of security in communications than can be accomplished using approaches based on classical physics. In order to achieve this goal there are significant accomplishments that must be overcome in practice although important successes have already been achieved in demonstration projects. Challenges common to many QKD and other communication methods are the speed of the sender's laser modulation, speed of receiver's detectors, and in the quantum photon methods reasonable assurance of having a single photon. Physical security is often overlooked in consideration of QKD systems. However challenges related to the physical security have which been identified include the speeding up of the modulation of the laser sources, eliminating the use of software driven random number generators, and eliminating the signature of the laser modulating electronic equipment. When, for example, an eavesdropper is near the sender physical security and stealth is important. Consideration must be given to mitigate the ability of the eavesdropper to be able to electronically detect the modulated power drawn by the sender's lasers, or be able to read the pseudo-random number generator the sender uses to choose frames. Other challenges in QKD system design include power, cost, weight and robustness of operation.

In the method of heralded stochastic QKD (HSQKD), the senders side has two lasers, a nonlinear crystal in front of each laser to generate a time entangled pair of photons. The laser can be continuous wave (cw) and the wave vectors oriented for Type-II spontaneous parametric down conversion (SPDC), although other configurations may sometimes be useful. The two photons impinge on a 50/50 beam splitter (equal probabilities of reflection and transmission). Those photons that are reflected pass through a polarizing prism that separates photons perpendicular to the crystal's optical axis (i.e.,0°), and parallel to the crystal's optical axis)(90°). A polarizer oriented at +45° filters the +90° side of the polarizing prism. Some of the photons that are not detected on the sender's side go on to the receiver. The photons at the receiver's side also transmit through another 50/50 beam splitter, and those pass through another polarizing prism also oriented at 0° and +90°. A polarizer at −45° filters the 0° side of the polarizing prism. Signals are monitored for the four detectors (D 0, D+45, D+90, D−45)just described at the sender (0° and +45°) and at the receiver (+90° and −45°.

Certain pairs of detection events are prohibited for Type-II SPDC regardless of the quantum state. If the sender detects a photon with the 0° polarizer, then the receiver can never detect a photon with the +90° photon. Similarly, if the sender detects a photon with the +45° polarizer, then the receiver cannot detect a photon with the −45° polarizer.

The laboratory implementation of designs similar to this at the Army Research Laboratory were realized using diode lasers and Single Photon Counting Modules (SPCMs), and Beta Barium Borate (BBO) crystals. Two continuous wave (cw) diode lasers were used as the source of photons, and neutral density filters used to cut-down the intensity for photon counting. The four photodetectors were SPCMs and narrow band filters at the degenerate SPDC wavelength (2). ±10 run) were used to protect them. The SPDC was collimated at the sender's side and projected a distance of >10 feet to the receiver's side. The photon coincidences were counted using a time amplitude converter (ORTEC) and processed in a PC. The PC processed the steps of the protocol that governs the generation of the quantum key.

The HSQKD Configuration is diagrammed in Provisional Application No. 60/653143 (FIG. 1). The sender uses two nonlinear crystals at appropriate angles to generate Type-I parametric fluorescence with degenerate wavelengths for signal and idler. The ideal crystal is cut and adjusted for Type-I phase matching conditions for collinear and degenerate parametric fluorescence of the symmetric energy state. Both energy states will have the same polarization. The optical axis of the first nonlinear crystal (in input channel a) is 0° while the other nonlinear crystal (in input channel b) is oriented at +45° to horizontal in the laboratory frame. The crystal in a is followed by a beam splitter (50/50), a polarizer with an optical axis at 0°, and a photon counting detector. The crystal in b is followed by a beam splitter (50/50), a polarizer with an optical axis at +45°, and another photon counting detector. The remaining beams are recombined by use of another polarizer (50/50) into a single beam that is sent to the beam splitter (50/50) of the receiver. At the receiver, one beam (in channel A) passes through a polarizer oriented at −45° to the horizontal to a photon counting detector while the other beam (in channel B) passes through a polarizer oriented at +90° to the horizontal. The heralded QKD protocol is based on synchronized clocks or timing pulses and joint single photon measurements.

The Heralded Stochastic Quantum Key Distribution (HSQKD System) scheme shows how entanglement can be used to simplify both the optics and the electronics while achieving security and speed. A protocol was developed which maintains secrecy and takes advantage of the photon stochastically from parametric down conversion crystal. The quantum key for translating a secret message to an encrypted message, and for translating the encrypted message back to the secret message, is represented by an operator Ki that acts on the ith bit value either with an identity or inverse operator. The protocol for determining Ki was given in R. Meyers, K. Deacon, "Entangled Photon Quantum Communications and Quantum Imaging" SPIE Proceedings Vol. 5161 (2003). The background of signals that must be rejected depends on the two-photon quantum state. The method of heralded photons is different from the B92 protocol in that it uses stochastic times, uses quantum fluctuations instead of the sender's choice of frames, and can use continuous wave lasers. The method of heralded photons is as secure against eavesdroppers as the B92 protocol. It is secure against some challenges to the physical security of the sender. However, the algorithms for generating and distributing a quantum key may be more complex than the standard B92 protocol.

Quantum imaging uses quantum physics to produce an image and has potential or realized advantages in many areas of imaging and communications. QKD and Quantum imaging are normally discussed as separate processes. However, in the following we briefly discuss using entanglement used in quantum imaging to achieve the embedding of a shared quantum key. An idealized laboratory setup is different from the usual quantum imaging setup. The difference is that polarizing beam splitters are placed in the path of the photons to provide two channels for each of the sender and receiver of the images. In the method the sender (Alice) sends the image of a mask to the receiver (Bob). In the figure PA is the path for photons on side of the sender (Alice) and PB is the path on side of the receiver (Bob). Bob will receive the image entirely from the photon coincidence measurements composited from his two scanning fiber tips in front of the detectors. Fast single photon CCDs can be used in a manner to obtain equivalent information to that of the scanning fiber tips. A stochastic quantum key is also generated between Alice and Bob based on the type of coincidence detected for instance, a PAV+PBH coincidence could be a bit 0 and a PAH+PBV could be a bit 1. The standard types of privacy amplification and key distillation algorithms can then be applied to this random shared bitstream. The embedding of this type of quantum key into quantum image transmission opens up the concept of Quantum Steganography.

A Quantum Channel Only Entanglement Imaging system is a means of transmitting an image using only a quantum channel is presented. The laboratory setup of a quantum imaging setup uses no classical channel between the sender and the receiver. This layout differs from earlier systems in that instead of a classical and a quantum channel being used to send the information of the image, only a quantum channel is used in this system.

An Energy Entangled Stochastic Quantum Key Distribution (EnESQKD) is a system which generates nearly collinear energy entangled photons and uses dichroic mirrors and narrowband filters to aid in the generation of shared quantum keys. While the stochastic energy based entanglement technique in not theoretically resistant to eavesdropping on shared quantum keys, because of the possibility of cloning, in practice it is difficult to eavesdrop on because of timing constraints. This method can be used as a research model system and can be used to generate shared random keys in an environment where eavesdropping is not a threat.

Figure 4:
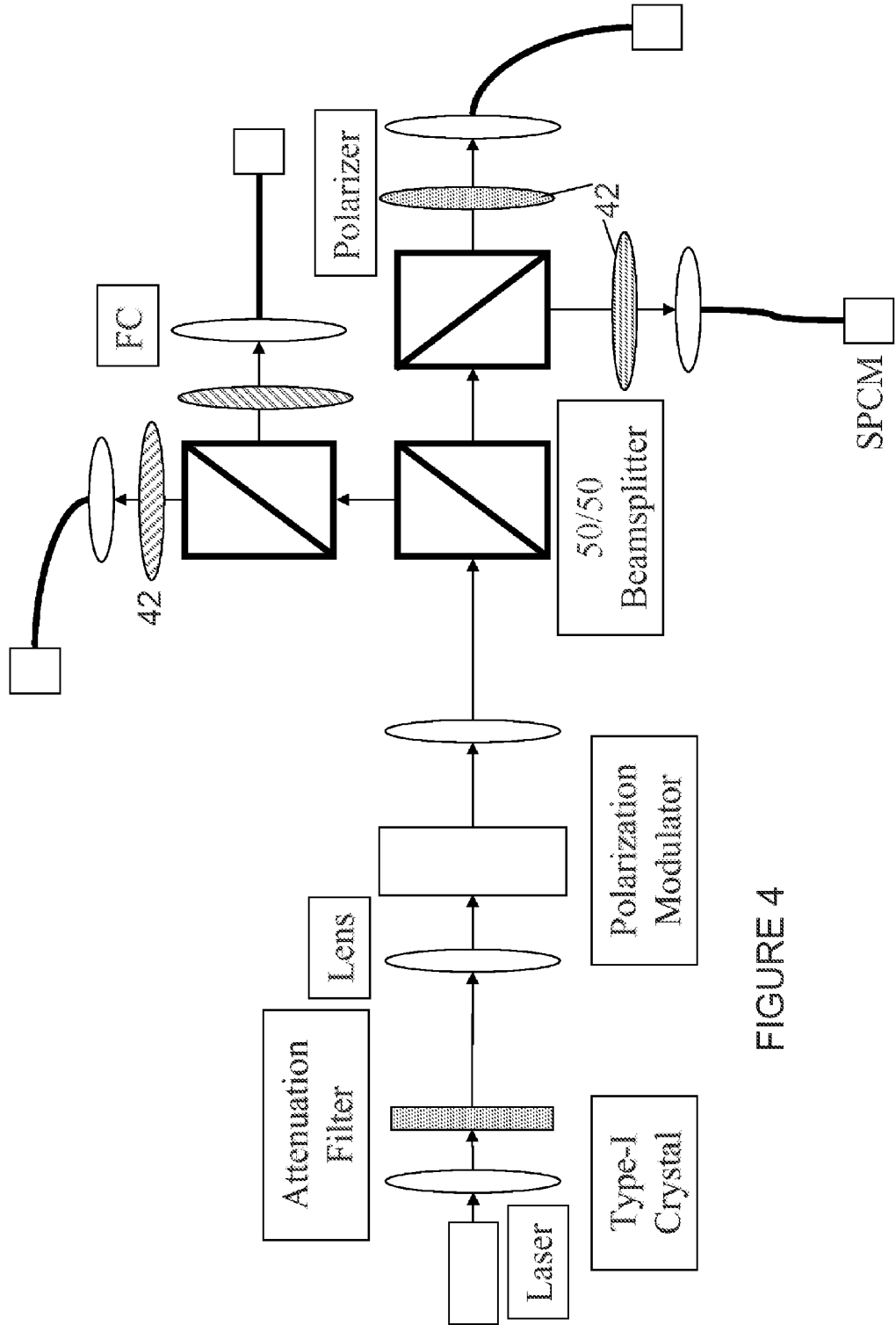
FIG. 4 is a schematic of the Entanglement Enhanced Stochastic Quantum Key Distribution (EESQKD) System.

An Entanglement Enhanced Stochastic Quantum Key Distribution (EESQKD) uses entanglement to increase the ratio of detected and counted photons to that of background detected and counted photons, as seen in FIG. 4. Nearly collinear energy entangled photons released in a stochastic unmodulated form are sent by the sender (Alice) to the receiver (Bob) through each of two laser sources with polarizers applied to the energy entangled pair. The polarizers are set up in a manner consistent with the B92 protocols. When the entangled photons are detected by the receiver (Bob), then a beam splitter will split each pair of biphotons and coincidences determine that the photons are from the sender (Alice) rather than being stray photons. Advantages to the method include stochasticity features mentioned above and enhancement of signal detection by means of coincidence measurements.

The feasibility of entangled quantum communications which use stochasticity in photon sources rather than laser modulation was explored through the development of several experimental prototype systems. Analyzed were Heralded Stochastic Quantum Key Distribution (HSQKD), Entanglement Enhanced Quantum Key Distribution (EEQKD), Entangled Energy Quantum Key Distribution (EEnQKD), Entanglement Imaging QKD Coincidence Detection, and an Entangled Imaging system that only uses a quantum channel. It was found that stochastic entangled quantum communications with continuous wave laser sources works well. It may find use in special applications needing advantages of small cost, weight, power and robustness since modulation hardware and software is not necessary with this approach.

Heralded Stochastic Quantum Key Distribution provides coincidence entanglement generated heralded timing in QKD. The Stochastic Energy Entanglement system may find use in applications coupled to other technologies and as a model quantum entanglement system.

REFERENCES CITED

[1] F. M. Kahnert, "Numerical methods in electromagnetic scattering theory," J. of Quantitative Spectroscopy & Radiative Transfer 79-80 (2003), 775-824.

[2] G. Barbosa, E. Corndorf, P. Kumar, H. Yuen, "Quantum cryptography in free space with coherent-state light," Proceedings SPIE Vol. 4821, 2002.

[3] H. Yuen, "Quantum versus classical noise cryptography", Quantum Communications and Measurements II, ed. P. Kumar et al., Plenum Press, 2000.

[4] H. Yuen, "Anonymous key quantum cryptography," Quantum Communications, Computations, and Measurements III, ed. P. Tomesi, et al., Plenum Press, 2001.

[5] J. Yen, P. Poirier, and M. O'Brien, "Intentionally short-range communications (ISRC) 1993 Report," Tech. Rep. 1649, SPAWAR, U.S. Navy, February 1994.

[6] M. Xu, W. Cai, M. Lax, and R. Alfano, "Stochastic view of photon migration in turbid media," cond-mat/0401409, http://arxiv.org.

[7] H. Ingensand and B. Boeckem, "High accuracy alignment system based on the dispersion effect," Proceedings IWAA97, 5th Workshop on Accelerator Alignment, ANL/FNL, 13-17 Oct. 1997, Argonne, Ill., USA, http://www.aps.anl.gov/conferences/iwaa97/finpap.html.

[8] R. Pinnick, P. Chylek, M. Jarzembski, E. Creegan, V. Srivastava, G. Fernandez, J. D. Pendleton, and A. Biswas, "Aerosol-induced laser breakdown thresholds: wavelength dependence," Appl. Opt. 27, 987-996 (1988).

[9] H. Brusselbach, D. C. Jones, D. A. Rockwell, and R. C. Lind, "Real-time atmospheric compensation by stimulated Brillouin-scattering phase conjugation," J. Opt. Soc. Am. B 12, 1434-1447 (1995).

[10] L. Elterman, "Rayleigh and extinction coefficients to 50 km for the region 0.27µ to 0.55µ," Appl. Opt. 3, 1139-1147 (1964).

[11] E. Trakhovskky, A. Ben-Shalom, U. P. Oppenhiem, A. D. Devir, L. S. Balfour, and M. Engel, "Contribution of oxygen to attenuation in the solar blind UV spectral region," Appl. Opt. 28, 1588-1592 (1989).

[12] R. Miles, W. Lempert, and J. Forkey, "Laser Rayleigh scattering," Meas. Sci. Technol., 12, R33-R52 (2001).

[13] M. Born and E. Wolf, "Diffraction by a conducting sphere; theory of Mie.," in Principles of Optics: Electromagnetic Theory of Propagation, Interference, and Diffraction of Light, 7th ed. (Cambridge University Press, Cambridge, UK, 1999), pp. 633-644.

[14] M. Rossum and M. Nieuwenhuizen, "Multiple scattering of classical waves: miroscopy, mesoscopy, and diffusion," Rev. Mod. Phys 17, N1 (1999).

[15] A. Ishamaru, Wave Propagation and Scattering in Random Media (Academic Press, New York, 1978).

[16] J. H. Sienfeld, Air Pollution and Chemical Fundamentals (McGraw-Hill, New York, 1975).

[17] H. C. van de Hulst, Light Scattering by Small Particles (Dover, New York, 1981).

[18] S. J. Masonis, T. L. Anderson, D. S. Covert, V. Kapustin, A. D. Clarke, S. Howell, and K. Moore, "2003: A study of the extinction-to-backscatter ratio of marine aerosol during the shore-line environment aerosol study," J. Atmos. Ocean. Tech. 20, 1388-1402 (2003).

[19] D. Hua, M. Uchida, and T. Kobayashi, "Ultraviolet high-spectral-resolution Rayleigh-Mie lidar with a dual-pass Fabry-Perot etalon for measuring atmospheric temperature profiles of the troposphere," Opt. Lett. 29, 1064-1065 (2004).

[20] L. Thompson and S. Teare, "Rayleigh Laser Guide Star Systems: Application to UnISIS," astroph/0207074, http://arxiv.org.

[21] S. Sharma, P. Lucey, M. Ghosh, H. Hubble, and K. Horton, "Stand-off Raman spectroscopic detection of minerals on planetary surfaces," Spect. Acta Part A 59, 2391-2407 (2003).

[22] N. Khan, N. Marium, I. Aris, and J. Yeak, "Laser-triggered lightning discharge," New J. Phys. 4, 61.1-61.20 (2002).

[23] P. Lodahl, A. P. Mosk, and A. Lagendijk, "Spatial quantum correlations in multiple scattered light," quant-ph/0502033, http://arxiv.org.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process for utilizing entangled photon pairs to communicate information through scattering media using a predetermined modulation, the process comprising:
   generating entangled photon pairs;
   selectively modulating each photon of the entangled photon pairs at predetermined synchronized time intervals to modify the same property of the quantum state of both photons within the entangled photon pair to encode the information in the form of a quantum communication photonic signal;
   transmitting the quantum communication photonic signal in a scattering media, the scattering media causing dispersion of the entangled photon pairs into multiple paths;
   receiving said scattered signal at least one receiver location which is located such that no direct line-of-sight light path to the sender location exists;
   demodulating the photonic signal, and
   measuring the at least one property of the quantum state of the photons to recover the information being sent;
   whereby the information is sent from the sender to the at least one receiver location in non linear paths utilizing the natural scattering effects of the media to create the transmission paths for the photons wherein the property of the quantum states of the entangled photon pair is substantially unaffected by the scattering media.

2. The process of claim 1 wherein the step of measuring comprises measuring the at least one property of the quantum state of both photons of the entangled photon pair and using entanglement associated with said entangled photon pair to authenticate the scattered signal.

3. The process of claim 2 wherein the process comprises using a shared modulation sequence to determine the modulation and wherein the step of generating entangled photon pairs comprises generating the entangled photon pairs in the UV wavelength range between 440 and 200 nanometers and the scattering is substantially omnidirectional; and wherein the scattering allows for the quantum communication photonic signal to be transmitted around an object through which light cannot penetrate and wherein the step of measuring comprises passing said scattered signal through orthogonal dichroic mirrors and at least one narrow band filter to yield the information being sent.

4. The process of claim 1 wherein the step of generating entangled photon pairs comprises generating entangle photon pairs in a first wavelength range with near collinearity from a Type-I nonlinear crystal at a sender location, the photons pairs having polarization in the same orientation.

5. The process of claim 1 wherein the step of generating entangled photon pairs comprises generating the entangled photon pairs in a first wavelength range selected on the basis of the behavior of the wavelength range in smoke, fog or water.

6. The process of claim 1 wherein the scattering media has as a majority component a substance selected from the group consisting of: air and each photon of said photon pair has wavelength between 440 and 200 nanometers, water and each photon of said photon pair has wavelength is between 560 and 440 nanometers, and a solid and each photon of said photon pair has wavelength is longer than 800 nanometers.

7. The process of claim 1 further comprising:
receiving simultaneously a second scattered signal derived from said entangled photon pairs at a second receiver location; and passing said second scattered signal through a second set of orthogonal dichroic mirrors and at least one narrow band filter to yield the transmitted information.

8. A system for utilizing photons to communicate information through scattering media; the system comprising:
a light source for emitting photons;
a processor for selectively modulating the photons at predetermined synchronized time intervals to modify the quantum property of certain of the photons to encode the information in the form of a photonic signal;
a transmitter for transmitting the photonic signal in a scattering media, the scattering media operating to scatter the photonic signal along multiple paths around obstructions such that the signal will reach multiple points of interest;
at least one receiver for receiving and detecting said scattered signal at at least one receiver location in a non-line-of-sight orientation relative to the sender location;
a processor for demodulating the photonic signal at synchronized time intervals and measuring the quantum property of the photons within the signal to recover the information being sent;
whereby the information is sent from the sender to the receiver in a non linear path utilizing the natural scattering effects of the media to create the transmission paths; the quantum property being substantially unaffected by the scattering media.

9. The system-of claim 8 wherein the light source for emitting photons is a nonlinear Type-I crystal that generates entangled photon pairs in a first wavelength range with near collinearity.

10. The system of claim 8 wherein the a light source emits photons in the UV range in the solar blind region so as to substantially eliminate noise interference from sunlight and wherein the photons are absorbed by the atmosphere after a propagation distance of approximately one kilometer so that the photonic signal is thus be substantially shielded by the atmosphere from long-distance surveillance.

11. The system of claim 8 wherein the photons communicate information through scattering media using at least one shared modulation sequence.

12. The system of claim 8 wherein the scattering media has as a majority component air and wherein the wavelength range of the photonic signal is between approximately 440 and 200 nanometers and the scattering is substantially omnidirectional and wherein the scattering allows for the photonic signal to be transmitted around an object through which light cannot penetrate.

13. The system of claim 8 and wherein the at least one receiver comprises a second receiver for simultaneously receiving a second scattered signal derived from the photonic signal transmission at a second receiver location; and the second receiver comprises a second set of orthogonal dichroic mirrors and at least one narrow band filter through which the received signal is passed to yield the transmitted information.

14. The system of claim 8 wherein the scattering media is water and the wavelength range of the photonic signal is between approximately 560 and 440 nanometers.

15. The system of claim 8 wherein the scattering media is a solid and the wavelength range is longer than approximately 800 nanometers.

16. The system of claim 8 wherein the photonic signal has a wavelength range which is predetermined based upon the scattering coefficients for the media, particulates within the media and the level of randomly fluctuating indices of refraction.

17. The system of claim 16 wherein the polarization is electronically controlled utilizing liquid crystals, Kerr cells, or Pockel cells.

18. The system of claim 8 wherein the step of selectively modulating the photons comprises electronically controlling the polarization rotation property of the quantum state of certain of the photons.

19. The system of claim 8 wherein the photons emitted by the light source comprise entangled photons and the processor selectively modulates the quantum property of certain of the entangled photons to encode the information.

* * * * *